United States Patent
Altschul et al.

(10) Patent No.: US 6,460,866 B1
(45) Date of Patent: Oct. 8, 2002

(54) COMBINATION WHEELED VEHICLE AND ARTICLE CARRIER

(75) Inventors: Randice-Lisa Altschul, Cliffside Park; Lee S. Volpe, Mount Laurel, both of NJ (US)

(73) Assignee: Diece-Lisa Industries, Inc., Cliffside Park, NJ (US)

(*) Notice: Subject to any disclaimer, the term of this patent is extended or adjusted under 35 U.S.C. 154(b) by 21 days.

(21) Appl. No.: 09/693,521

(22) Filed: Oct. 20, 2000

(51) Int. Cl.[7] ............................................. B62B 1/04
(52) U.S. Cl. .................. 280/30; 280/47.26; 280/304.5; 224/153; 150/159
(58) Field of Search .................. 280/87.01, 87.021, 280/87.041, 87.05, 30, 37, 638, 643, 43, 43.1, 43.11, 43.13, 43.15, 43.16, 43.17, 47.26, 651, 304.5, 655; 150/159, 166; 224/153; 190/18 A

(56) References Cited

U.S. PATENT DOCUMENTS

| | | | | |
|---|---|---|---|---|
| 2,722,966 A | * | 11/1955 | Belyeu | 280/30 |
| 3,829,113 A | * | 8/1974 | Epelbaum | 280/30 |
| 3,984,115 A | * | 10/1976 | Miller | 280/30 |
| 4,368,835 A | * | 1/1983 | Murphy | 224/153 |
| 4,586,721 A | * | 5/1986 | Harada et al. | 280/30 |
| 4,620,711 A | * | 11/1986 | Dick | 280/30 |
| 4,747,526 A | * | 5/1988 | Launes | 224/155 |
| 4,762,256 A | * | 8/1988 | Whitaker | 224/161 |
| 5,213,360 A | * | 5/1993 | Lin | 280/648 |
| 5,265,695 A | * | 11/1993 | Piazzi | 180/208 |
| 5,709,400 A | * | 1/1998 | Bonnier et al. | 280/650 |
| 5,820,146 A | * | 10/1998 | Van Ligten | 280/87.041 |
| 2002/0050429 A1 | * | 5/2002 | Nykoluk et al. | 190/115 |

FOREIGN PATENT DOCUMENTS

DE 3138095 A1 * 4/1983 ............ 280/87.041

* cited by examiner

Primary Examiner—Brian L. Johnson
Assistant Examiner—G B Klebe
(74) Attorney, Agent, or Firm—Arthur Jacob

(57) ABSTRACT

A combination wheeled vehicle and article carrier is capable of being converted between selected configurations, including a rider-carrying scooter configuration and a rider-carried pack configuration. The scooter configuration provides a scooter having a handle, front and back wheels, and a selectively extensible foot board assembly for selecting wheelbase length to attain desired ride and handling characteristics. Steering is accomplished by tilting of the scooter with the assistance of a tiller arrangement. The pack configuration includes a pack member, and the handle, front wheels and foot board assembly are selectively retracted into juxtaposition with the pack member to provide a compact backpack when the combination is in the pack configuration.

15 Claims, 8 Drawing Sheets

COMBINATION WHEELED VEHICLE AND ARTICLE CARRIER

BACKGROUND OF THE INVENTION

The present invention relates generally to combination wheeled vehicles and article carriers and pertains, more specifically, to a combination wheeled vehicle and article carrier capable of being converted between selected configurations, including a rider-carrying scooter configuration and a rider-carried pack configuration.

Currently, scooters are enjoying a renaissance among both adults and children and have appeared in various simplified, lightweight designs. These scooters are being used not only for recreational purposes, but for basic short-run transportation as well. Further, a perennial favorite among both adults and children is the ubiquitous backpack, designed to carry a very wide variety of articles in a most-convenient manner. However, in instances where it is desired to carry items, such as books, papers, groceries and other articles usually associated with short-run transportation, the use of backpacks and scooters together has proved to be awkward, at best, and, at worst, dangerous.

SUMMARY OF THE INVENTION

The present invention provides a combination wheeled vehicle and carrier which enables a rider of a scooter to carry articles with ease and safety, while allowing the scooter itself conveniently to be carried and stowed. As such, the present invention attains several objects and advantages, some of which are summarized as follows: Provides all of the recreation and convenience of a compact, lightweight scooter combined with the ability to carry a very wide variety of articles with increased ease; enables increased ease of use of a compact scooter, with greater safety, while providing for convenience of transportation and storage of the scooter itself; provides a compact scooter having advanced ride and handling characteristics, combined with the ability to carry items ordinarily inconvenient to carry on a scooter; enables more versatile use of a compact scooter, with increased ease and safety; provides an aesthetically pleasing scooter configuration which attains greater comfort and safety during operation; enables convenience and ease in the storage of a compact scooter so as to allow more widespread use for transportation runs where scooter use previously has proved inappropriate or impractical; provides a highly maneuverable scooter capable of negotiating rough or irregular surfaces, as well as compensating for foreign objects and obstacles which might be encountered along such surfaces, with increased ease and safety; enables selective adjustment of ride and handling characteristics of a scooter; provides a rugged construction capable of exemplary performance over an extended service life.

The above objects and advantages, as well as further objects and advantages, are attained by the present invention which may be described briefly as a combination wheeled vehicle and article carrier capable of being converted between selected configurations, including a rider-carrying scooter configuration and a rider-carried pack configuration, the combination comprising: a main frame; a front wheel assembly on the main frame; a handle having a handle shaft mounted upon the main frame and extending in a generally altitudinal direction upwardly from a given location adjacent the front wheel assembly; a pack member on the main frame, adjacent the front wheel assembly, the pack member extending in a generally altitudinal direction upwardly from the front wheel assembly and juxtaposed with the handle shaft; a carrier compartment within the pack member for carrying articles; a foot board assembly having a near end and a far end spaced away from the near end, the foot board assembly including a foot board extending between the near end and the far end; a mount mounting the foot board assembly upon the main frame for pivotal movement between an extended position, wherein the foot board extends in a generally longitudinal direction for the reception of a rider, and a retracted position, wherein the foot board extends in the generally altitudinal direction in juxtaposition with the pack member; and a rear wheel assembly adjacent the far end of the foot board assembly for selectively being spaced from the front wheel assembly in the longitudinal direction, when the foot board assembly is in the extended position, thereby placing the combination in the scooter configuration so as to support the rider on the foot board between the front wheel assembly and the rear wheel assembly, and for selectively being-retracted into juxtaposition with the pack member, when the foot board assembly is in the retracted position, thereby placing the combination in the pack configuration.

BRIEF DESCRIPTION OF THE DRAWINGS

The invention will be understood more fully, while still further objects and advantages will become apparent, in the following detailed description of a preferred embodiment of the invention illustrated in the accompanying drawing, in which.

DETAILED DESCRIPTION

Figure 1:
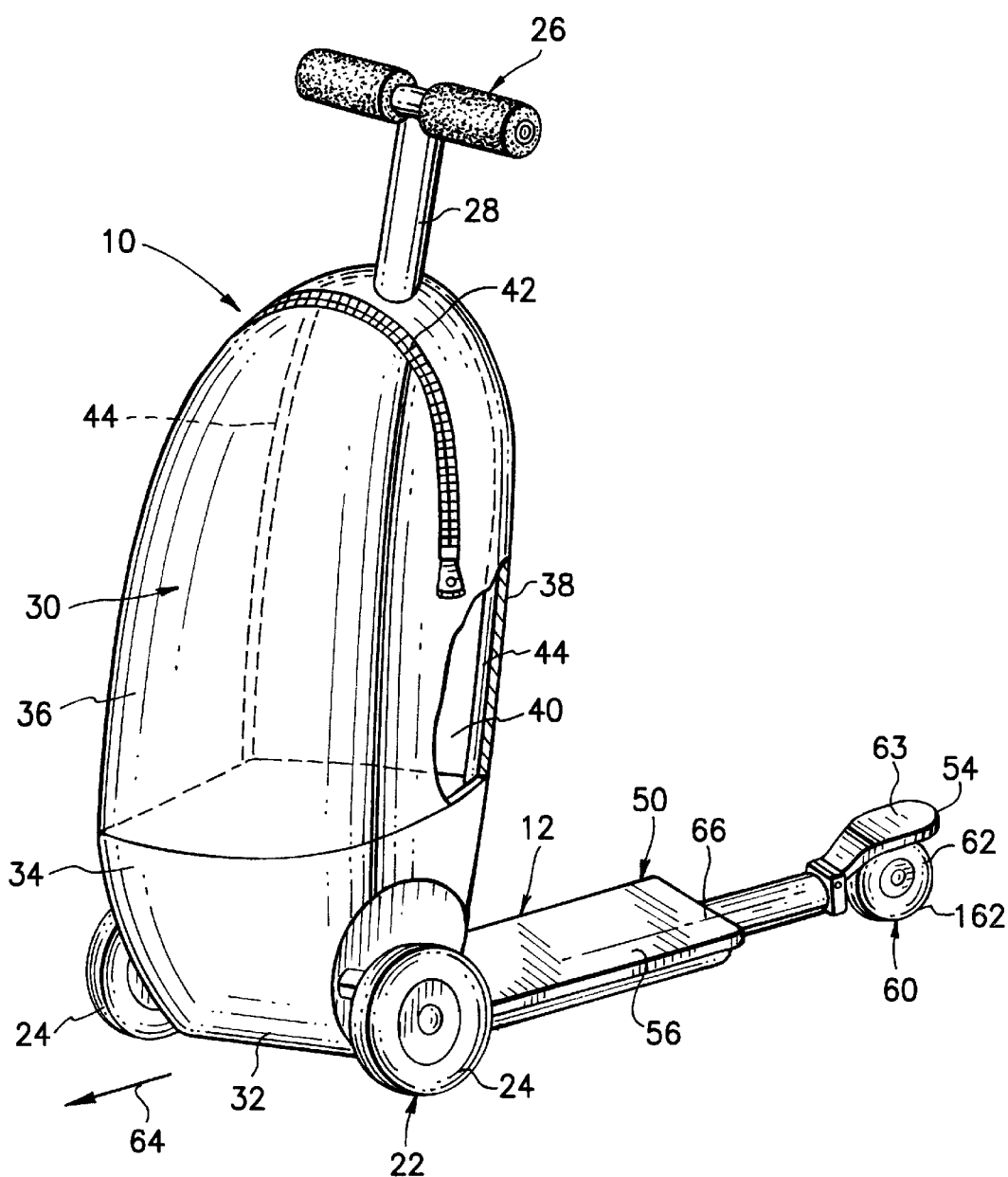
FIG. 1 is a front and side pictorial perspective view of a combination wheeled vehicle and article carrier constructed in accordance with the present invention, in a rider-carrying scooter configuration.

Referring now to the drawing, and especially to FIGS. 1 through 5 thereof, a combination wheeled vehicle and article carrier constructed in accordance with the present invention is shown at 10. Combination 10 is capable of being converted from a ride-carrying scooter configuration, shown as scooter 12 in FIG. 1, to a rider-carried pack configuration, shown as backpack 14 in FIG. 2, and back again from the backpack 14 to the scooter 12. Scooter 12 has a main frame 20 upon which there is mounted a front wheel assembly 22. In the illustrated preferred embodiment, front wheel assembly 22 includes two wheels 24 spaced apart laterally from one another. A handle 26 includes a handle shaft 28 mounted upon the main frame 20 and extending in a generally altitudinal direction upwardly from a given location 29 adjacent the front wheel assembly 22.

A pack member 30 is carried by and attached to the main frame 20, adjacent the front wheel assembly 22, extends in the generally altitudinal direction upwardly from the front wheel assembly 22, and is juxtaposed with the handle shaft 28. Pack member 30 includes a hollow lower boot 32 constructed of a material which is flexible, yet stiff enough to retain a desired shape, such as the relatively streamlined aerodynamic contour configuration illustrated at 34. A suitable material for lower boot 32 is a molded elastomer, such as rubber or PVC. Pack member 30 further includes a housing 36 extending upwardly from boot 32 and having a generally flexible housing wall 38 establishing an inner compartment 40 for carrying articles. A slide fastener closure 42 provides access to the compartment 40 and closes the compartment 40 for effective protection against the loss of any contents of the compartment 40. A suitable material for housing wall 38 is a synthetic polymeric fabric material, such as nylon fabric. In the preferred construction, a reinforcing frame 44 of a flexible reinforcing material, such as a filament reinforced polyester, is placed within the compartment 40 to maintain a desired sleek, aerodynamic contour configuration in housing 36, while allowing selective collapse of the wall 38, when compartment 40 is empty, for facilitating storage of the combination 10. When erect, wall 38 provides not only a pleasing streamlined aesthetic appearance, but also provides a shield against wind as well as against water and foreign objects which might be encountered along the surface traversed by scooter 12.

A foot board assembly 50 has a near end 52 and a far end 54 spaced away from the near end 52 and carries a foot board 56 which extends between the near end 52 and the far end 54. A rear wheel assembly 60 is placed adjacent the far end 54 of the foot board assembly 50 and, in the illustrated preferred embodiment, includes a single wheel 62 and a combined rear fender and brake pedal 63. The scooter 12 is capable of being ridden by a rider (not shown) in the conventional manner; that is, the rider is supported on the foot board 56, grasps handle 26 and moves the scooter 12 forward, in the forward direction 64, using the brake pedal 63 as needed.

Figure 2:
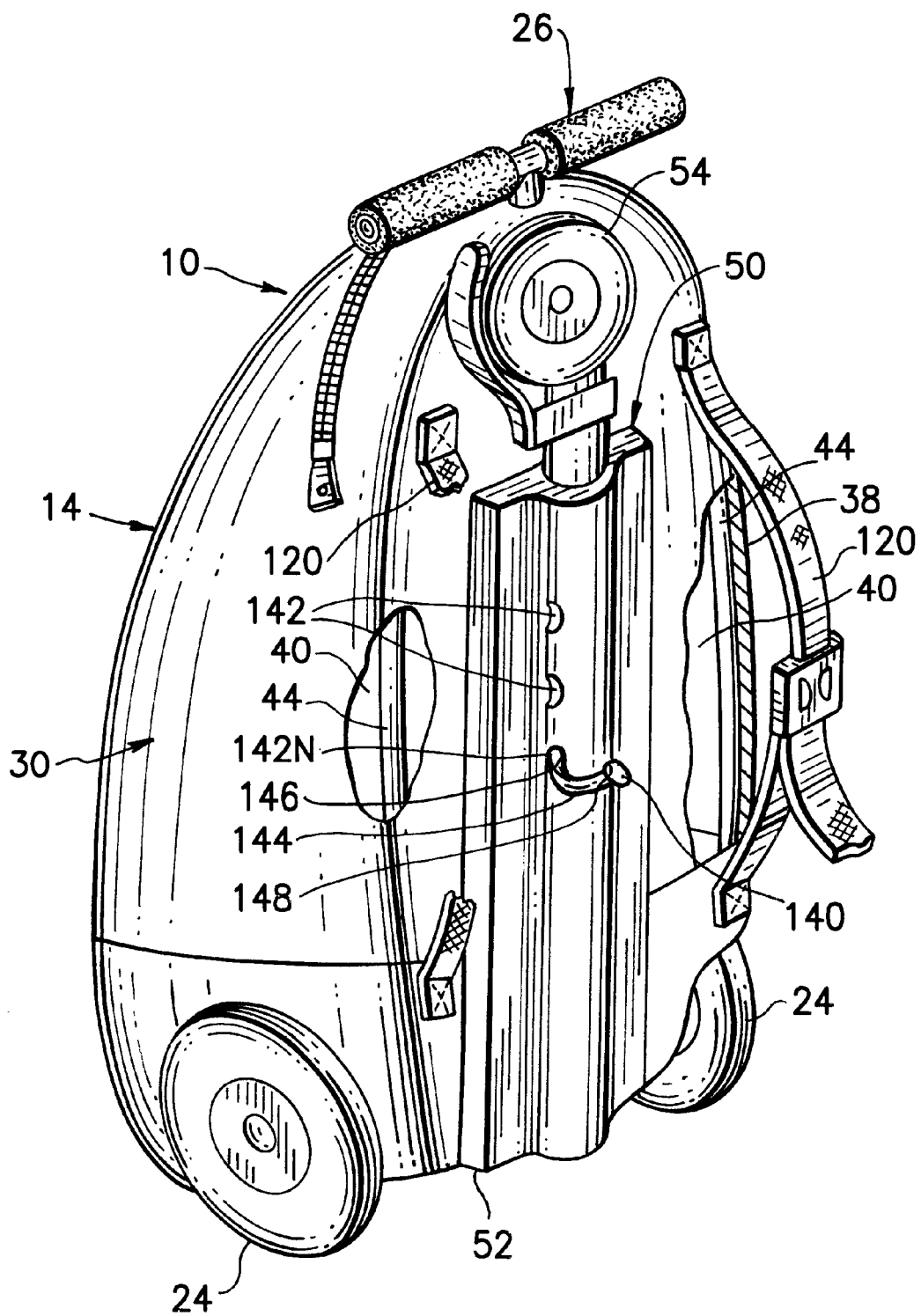
FIG. 2 is a rear and side pictorial perspective view of the combination of FIG. 1, in a rider-carried pack configuration.
Figure 3:
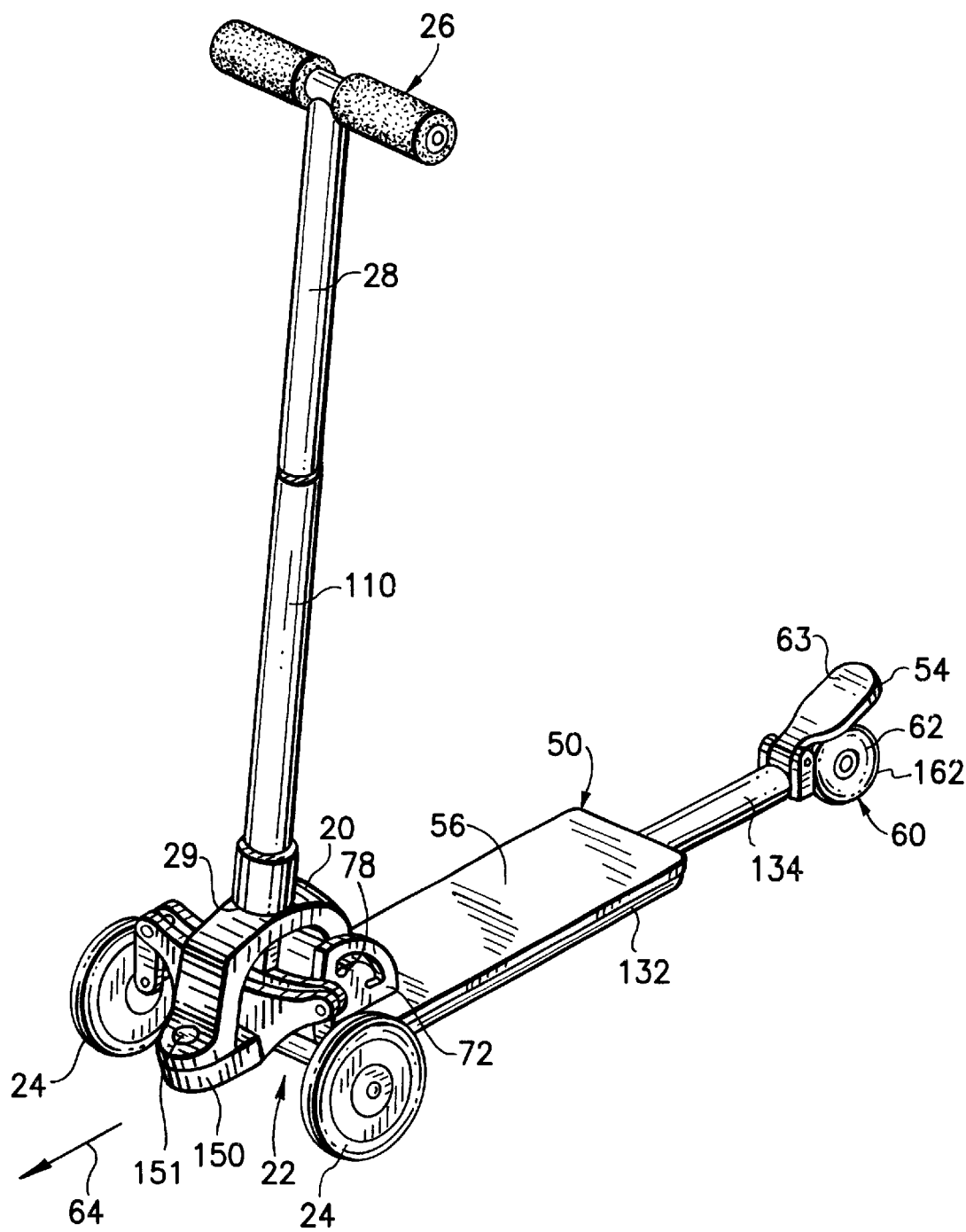
FIG. 3 is a pictorial perspective view similar to FIG. 1, but with component parts deleted to expose details of construction.
Figure 4:
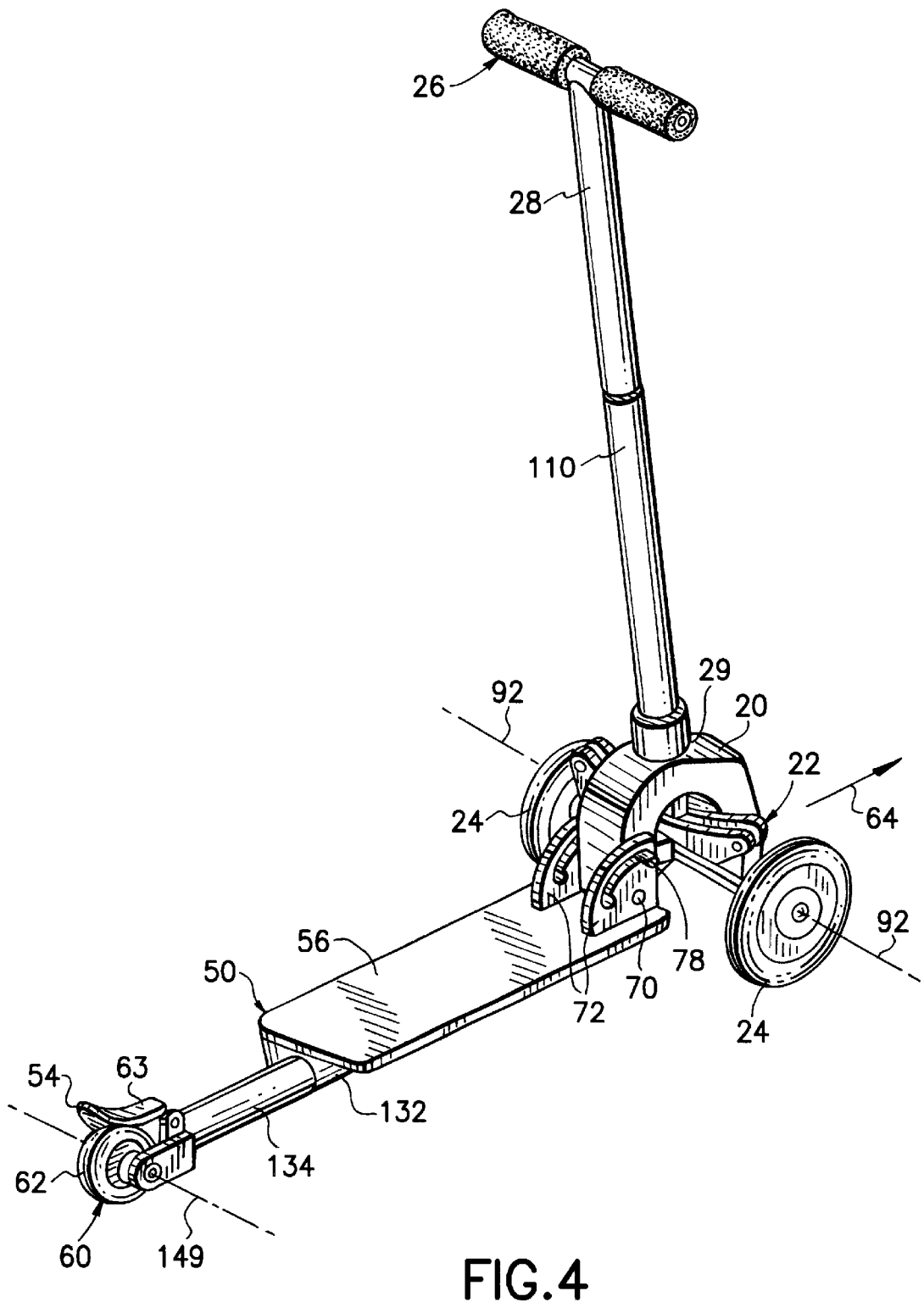
FIG. 4 is a rear and side pictorial perspective view of the combination depicted in FIG. 3.
Figure 5:
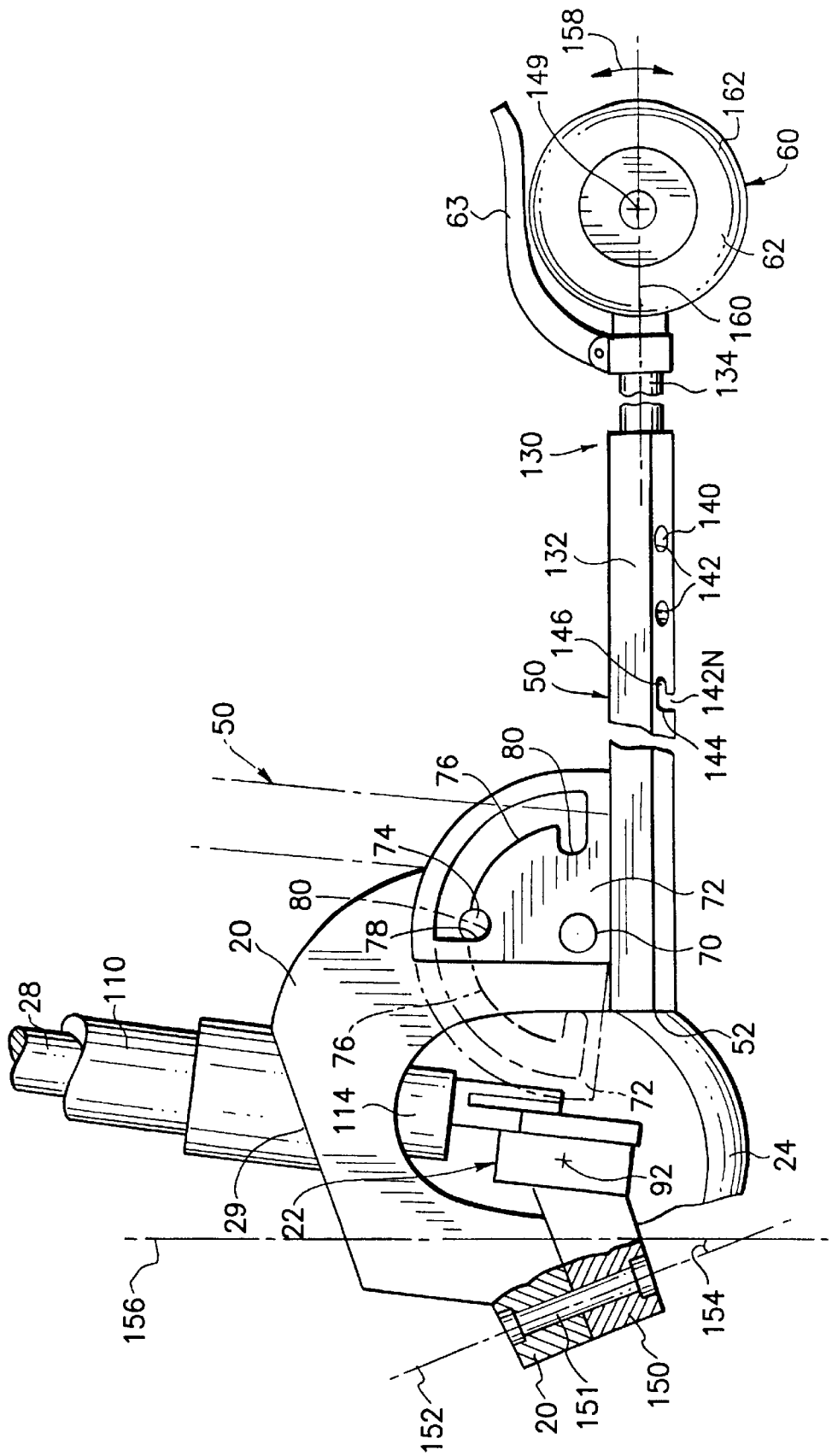
FIG. 5 is an enlarged fragmentary side elevational view of the combination depicted in FIG. 3.

When it is desired to convert the scooter 12 to backpack 14, the foot board assembly 50 is moved from the extended position shown in FIG. 1, wherein the foot board 56 extends in a generally longitudinal direction 66, to a retracted position, shown in FIG. 2. A mount is illustrated in the form of a hinge pin 70 which passes through the main frame 20 and brackets 72 of the foot board assembly 50 to mount the foot board assembly 50 for pivotal movement between the extended position and the retracted position. A locking arrangement is shown in the form of a latch pin 74 which rides in arcuate grooves 76 in brackets 72 and which is biased into one or the other of latch recesses 78 and 80. In the extended position illustrated in FIG. 1, latch pin 74 is seated in recesses 78, as shown in FIGS. 3 through 5, and secures the foot board assembly 50 in place in the extended position. In the retracted position illustrated in FIG. 2, the latch pin 74 is seated in recesses 80, as shown in phantom in FIG. 5, and secures the foot board assembly 50 in place in the retracted position.

Figure 6:
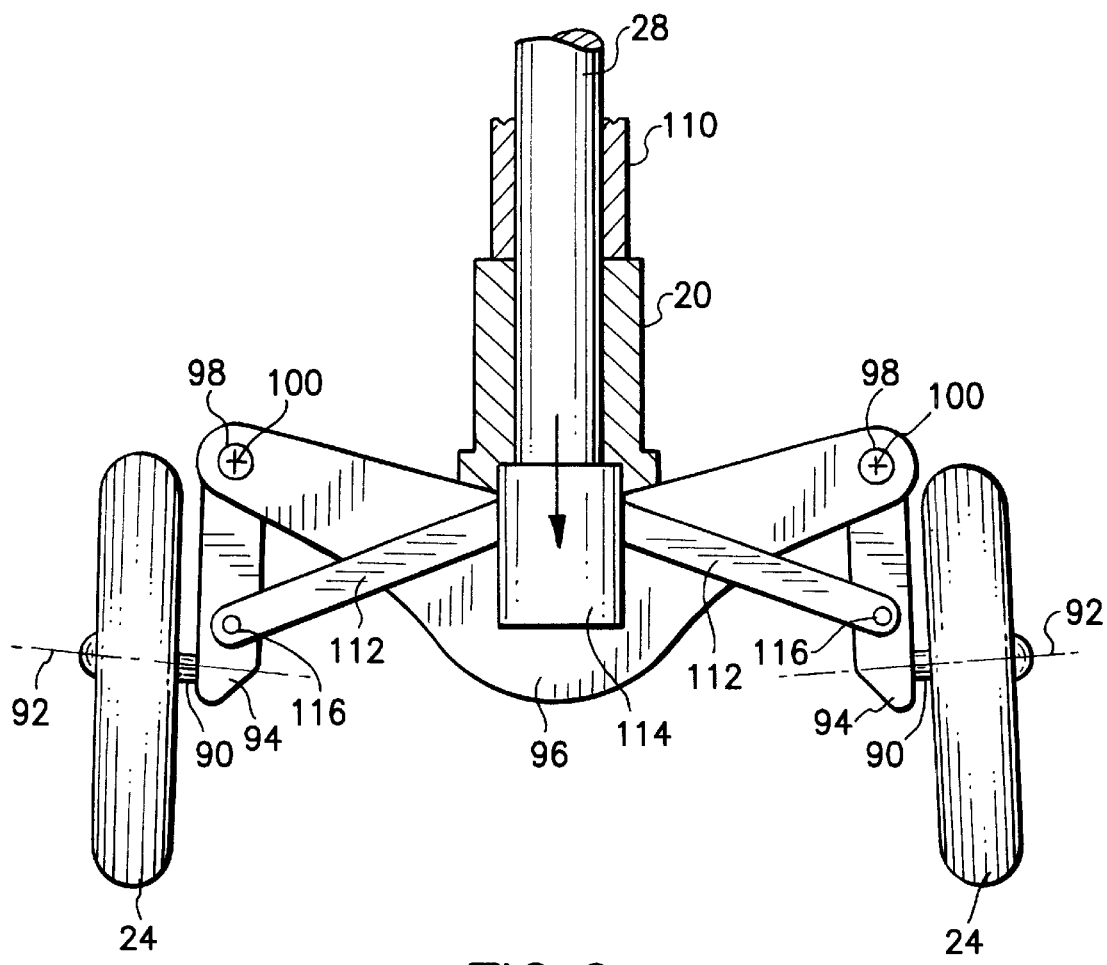
FIGS. 6 and 7 are largely diagrammatic views illustrating the operation of component parts of the combination.
Figure 7:
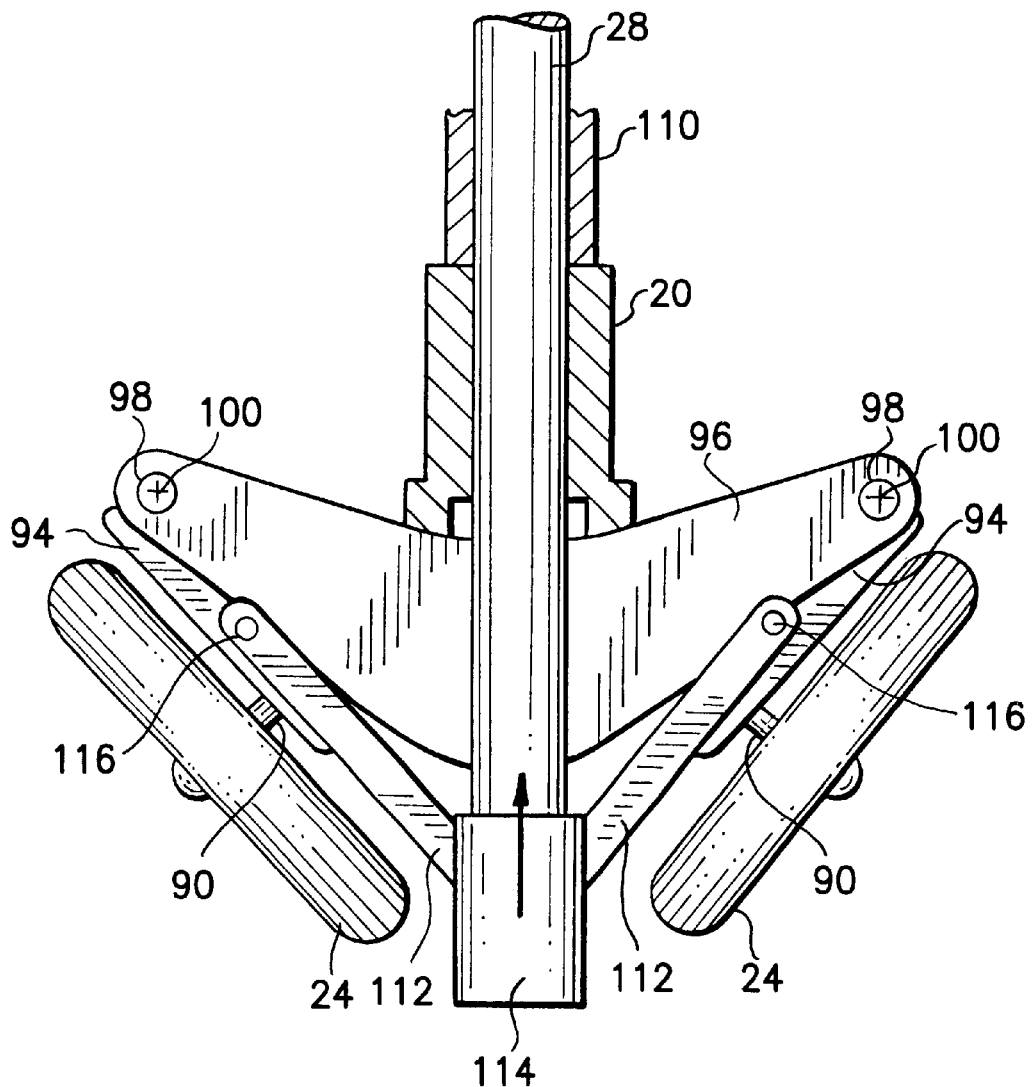

In the retracted position, foot board assembly 50 is in close juxtaposition with the pack member 30, as illustrated in FIG. 2. In order further to convert the scooter 12 to the backpack 14, the front wheels 24 are retracted into close juxtaposition with the pack member 30 by a wheel retraction mechanism, as will now be described in connection with FIGS. 6 and 7, as well as FIGS. 1 through 5. A front wheel suspension system journals front wheels 24 upon stub axles 90 for rotation about essentially lateral front axes 92 extending transverse to the forward direction 64 and the longitudinal direction 66, when the wheels 24 are in the running position illustrated in FIGS. 1 and 6, and stub axles 90 are carried by axle pads 94 mounted upon a transverse plate 96 carried by the main frame 20. Axle pads 94 are mounted upon plate 96 at 98 for pivotal movement about longitudinal axes 100. Handle shaft 28 is mounted upon main frame 20, at location 29, for sliding movement upwardly and downwardly in altitudinal directions within a sleeve 110 integral with the main frame 20. Thus, handle shaft 28 is moved selectively between an upper position, shown in FIG. 6, wherein handle 26 is placed at a handle-extended position, spaced upwardly from the pack member 30 as seen in FIG. 1, in position to be grasped by a rider, and a lower position, as shown in FIG. 7, wherein handle 26 is in a handle-retracted position, retracted into juxtaposition with the pack member 30, as seen in FIG. 2. Upon movement of the handle shaft 28 to the lower position, illustrated in FIG. 7, tie arms 112, which are coupled to the handle shaft 28 at a coupling 114 and are pinned to each axle pad 94 at pivot pins 116, pivot the axle pads 94 to draw the axle pads 94 into the positions shown in FIG. 7 and thereby retract the wheels 24 into the wheel-retracted positions shown in FIG. 7, and, consequently, into juxtaposition with the pack member 30, as seen in FIG. 2.

With the handle 26, the wheels 24 and the foot board assembly 50 all retracted into juxtaposition with the pack member 30, as described above, the scooter 12 is converted into the backpack 14. A harness arrangement, shown in the form of straps 120 affixed to the housing 36 of pack member 30, enables the backpack 14 to be attached for carrying in the manner in which backpacks conventionally are carried.

Referring now to FIGS. 3 through 5, the riding capacity and the riding characteristics of scooter 12 are selectively adjustable by virtue of the selective adjustment of the longitudinal distance between the front wheels 24 and the rear wheel 62, i.e., the wheelbase of the scooter 12. To that end, foot board assembly 50 includes a sub-frame 130 having a forward frame member 132 and a rearward frame member 134 telescopically engaged with one another such that the length of the sub-frame 130 selectively is extended or retracted by telescoping the rearward frame member 134 longitudinally out of or into the forward frame member 132. Upon reaching a selected one of several longitudinal spacings thus made available between the front wheels 24 and the rear wheel 62, the telescoping frame members 132 and 134 are locked against relative movement by a locking mechanism, shown in the form of a detent arrangement having detent elements including a spring-biased projection 140 carried by the rearward frame member 134 and a plurality of apertures 142 carried by the forward frame member 132. Apertures 142 are complementary to projection 140 so that upon reaching any one selected longitudinal spacing, projection 140 is received within a corresponding aperture 142 to secure the frame members 132 and 134 against movement relative to one another. In this manner, a rider is able to tailor the ride and steering characteristics of scooter 12 as desired, a longer wheelbase providing a more stable ride while a shorter wheelbase enables tighter turns for quick maneuvers. Typically, the wheelbase is adjusted in three-inch increments, between a minimum length of eighteen inches and a maximum length of twenty-four inches.

In addition to enabling wheelbase length selection, the telescoping frame members 132 and 134 accomplish shortening of the length of the foot board assembly 50 for retraction of the foot board assembly 50 into juxtaposition with the pack member 30. Thus, upon the projection 140 entering the aperture 142N located nearest the near end 52 of the foot board assembly 50, the frame members 132 and 134 establish a compact length facilitating placement of the foot board assembly 50 in the retracted position. For greater comfort during carrying the backpack 14, as well as for a more compact backpack 14, the telescoping frame members 132 and 134 have complementary cylindrical configuration and aperture 142N is in the form of a circumferential groove 144 having end slots 146 and 148. With the projection 140 in end slot 146, the rear wheel 62 is oriented in a running position; that is, the rear wheel 62 is in position to rotate about a rear lateral axis 149, as seen in FIG. 5. Upon movement of the projection 140 along groove 144 and into slot 148, rear wheel 62 is swiveled 90° and locked in place to lie flat against the pack member 30 when foot board assembly 50 is in the retracted position, as seen in FIG. 2. Steering is accomplished by selectively tilting the scooter 12 to change the direction of forward travel, as will now be described. Referring again to FIGS. 3 through 5, the front wheels 24, as well as the front wheel suspension system, are parts of a truck 150 mounted upon the main frame 20, by means of a pivot pin 151, for pivotal movement about a directional axis 152 lying in an intermediate plane passing between the front wheels 24, the intermediate plane being the plane of the paper in FIG. 5. The directional axis 152 makes an acute angle 154 with altitudinal direction 156, acute angle 154 preferably being about 20°, and is located forward of the lateral axes 92 about which the front wheels 24 rotate such that upon tilting of the main frame 20 in tilting directions 158 about a longitudinal axis 160 lying in the intermediate plane, while the scooter 12 is moving forward, the truck 150 is biased into a steered direction corresponding to the tilting direction, in response to the forward movement of the main frame 20.

Tilting of the scooter 12 during forward movement is accomplished with the assistance of the handle shaft 28 which serves as a tiller urged by the rider in appropriate side-to-side lateral directions corresponding to the changes desired in the direction of travel. Stability during tilting is enhanced by providing the rear wheel 62 with a tread 162 having a generally spherical cross-sectional configuration. The provision of truck 150 with laterally spaced apart front wheels 24 not only allows the convenience of steering by tilting, but provides a high degree of stability which is maintained over rough or irregular surfaces traversed by the scooter 12, and accommodates for various foreign objects and obstacles which might be encountered along such surfaces.

Figure 8:
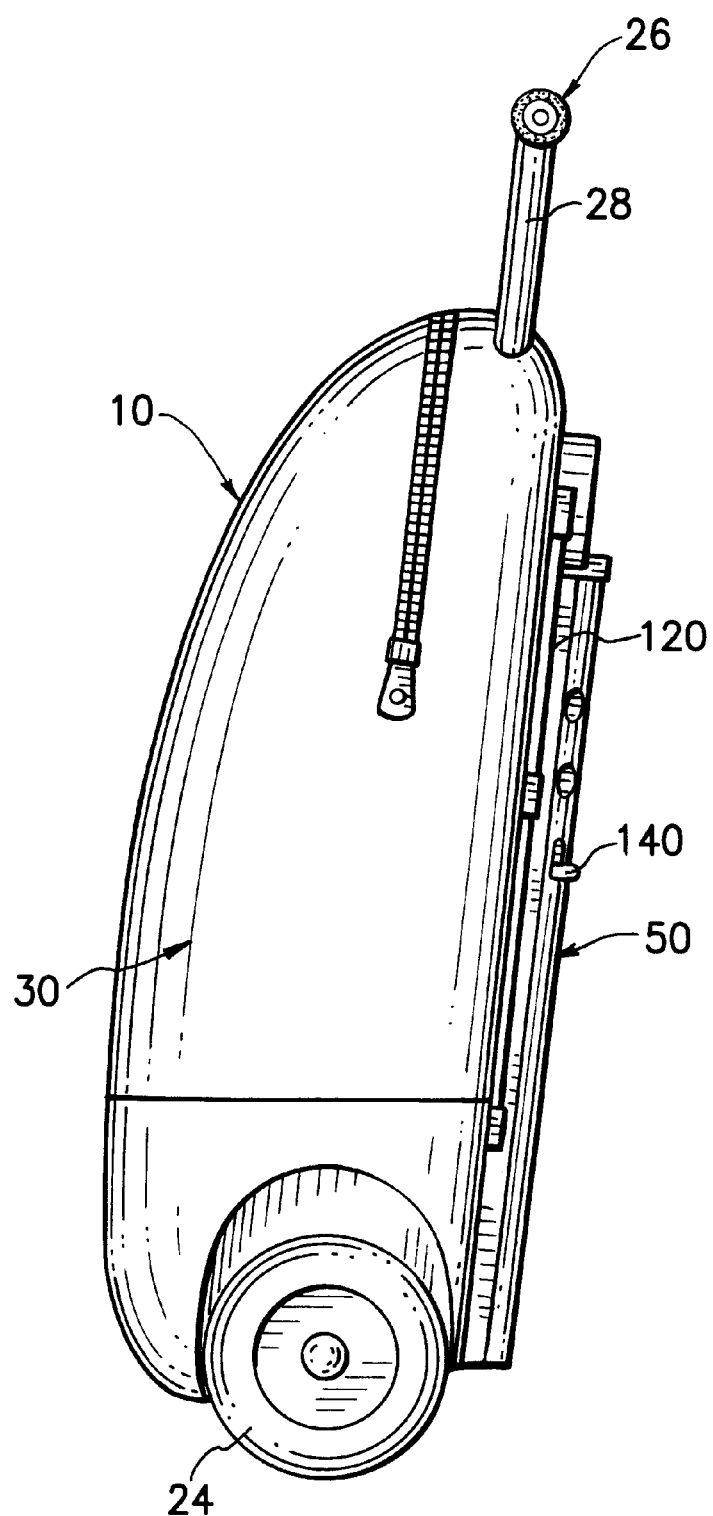
FIG. 8 is a side elevational view of the combination of FIG. 1 in another selected configuration.

In the intermediate configuration illustrated in FIG. 8, the foot board assembly 50 has been moved to the retracted position, as described above; however, the handle 26 and the front wheels 24 are not retracted. In this intermediate configuration, the combination 10 may be pulled or pushed along by grasping the handle 26 and moving the combination 10 along, on the front wheels 24 only. In this manner, the combination 10 offers increased versatility in transporting both the scooter 12 and the backpack 14.

It will be seen that the present invention accomplishes the several objects and advantages summarized above, namely: Provides all of the recreation and convenience of a compact, lightweight scooter combined with the ability to carry a very wide variety of articles with increased ease; enables increased ease of use of a compact scooter, with greater safety, while providing for convenience of transportation and storage of the scooter itself; provides a compact scooter having advanced ride and handling characteristics, combined with the ability to carry items ordinarily inconvenient to carry on a scooter; enables more versatile use of a compact scooter, with increased ease and safety; provides an aesthetically pleasing scooter configuration which attains greater comfort and safety during operation; enables convenience and ease in the storage of a compact scooter so as to allow more widespread use for transportation runs where scooter use previously has proved inappropriate or impractical; provides a highly maneuverable scooter capable of negotiating rough or irregular surfaces, as well as compensating for foreign objects and obstacles which might be encountered along such surfaces, with increased ease and safety; enables selective adjustment of ride and handling characteristics of a scooter; provides a rugged construction capable of exemplary performance over an extended service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A combination wheeled vehicle and article carrier capable of being converted between selected configurations, including a rider-carrying scooter configuration and a rider-carried pack configuration, the combination comprising:

a main frame;

a front wheel assembly on the main frame;

a handle having a handle shaft mounted upon the main frame and extending in a generally altitudinal direction upwardly from a given location adjacent the front wheel assembly;

a pack member on the main frame, adjacent the front wheel assembly, the pack member extending in a generally altitudinal direction upwardly from the front wheel assembly, juxtaposed with the handle shaft, and attached to the main frame so as to join the pack member with the main frame for carrying the combination as an integral unit when in the pack configuration;

straps affixed to the pack member for carrying the combination when in the pack configuration;

a carrier compartment within the pack member for carrying articles when the combination is in either one of the scooter configuration and the pack configuration;

a foot board assembly having a near end and a far end spaced away from the near end, the foot board assembly including a foot board extending between the near end and the far end;

a mount mounting the foot board assembly upon the main frame for pivotal movement between an extended position, wherein the foot board extends in a generally longitudinal direction for the reception of a rider, and a retracted position, wherein the foot board extends in the generally altitudinal direction in juxtaposition with the pack member; and a rear wheel assembly adjacent the far end of the foot board assembly for selectively being spaced from the front wheel assembly in the longitudinal direction, when the foot board assembly is in the extended position, thereby placing the combination in the scooter configuration so as to support the rider on the foot board between the front wheel assembly and the rear wheel assembly, and for selectively being retracted into juxtaposition with the pack member, when the foot board assembly is in the retracted position, thereby placing the combination in the pack configuration.

2. The combination of claim 1 including a locking arrangement for securing the foot board assembly in a selected one of the extended position and the retracted position.

3. The combination of claim 1 wherein the straps include a harness arrangement on the pack member for attachment of the combination to the rider when the combination is in the pack configuration.

4. A combination wheeled vehicle and article carrier capable of being converted between selected configurations, including a rider-carrying scooter configuration and a rider-carried pack configuration, the combination comprising:

a main frame;

a front wheel assembly on the main frame;

a handle having a handle shaft mounted upon the main frame and extending in a generally altitudinal direction upwardly from a given location adjacent the front wheel assembly;

a pack member on the main frame, adjacent the front wheel assembly, the pack member extending in a generally altitudinal direction upwardly from the front wheel assembly and juxtaposed with the handle shaft;

a carrier compartment within the pack member for carrying articles;

a foot board assembly having a near end and a far end spaced away from the near end, the foot board assembly including a foot board extending between the near end and the far end;

a mount mounting the foot board assembly upon the main frame for pivotal movement between an extended position, wherein the foot board extends in a generally longitudinal direction for the reception of a rider, and a retracted position, wherein the foot board extends in the generally altitudinal direction in juxtaposition with the pack member; and a rear wheel assembly adjacent the far end of the foot board assembly for selectively being spaced from the front wheel assembly in the longitudinal direction, when the foot board assembly is in the extended position, thereby placing the combination in the scooter configuration so as to support the rider on the foot board between the front wheel assembly and the rear wheel assembly, and for selectively being retracted into juxtaposition with the pack member, when the foot board assembly is in the retracted position, thereby placing the combination in the pack configuration;

the front wheel assembly including at least one front wheel, and a wheel retraction mechanism for selectively moving the front wheel between a running position, wherein the front wheel is spaced altitudinally downwardly from the pack member, and a wheel-retracted position, wherein the front wheel is retracted into juxtaposition with the pack member.

5. The combination of claim 4 including a handle mounting arrangement mounting the handle upon the main frame for movement in altitudinal directions between a handle-extended position, wherein the handle is spaced altitudinally upwardly from the pack member in position to be grasped by the rider, and a handle-retracted position, wherein the handle is retracted into juxtaposition with the pack member.

6. The combination of claim 5 including a coupling for coupling the handle with the wheel retraction mechanism such that upon movement of the handle to the handle-extended position, the front wheel is moved to the running position, and upon movement of the handle to the handle-retracted position, the front wheel is moved to the wheel-retracted position.

7. A combination wheeled vehicle and article carrier capable of being converted between selected configurations, including a rider-carrying scooter configuration and a rider-carried pack configuration, the combination comprising:

a main frame;

a front wheel assembly on the main frame;

a handle having a handle shaft mounted upon the main frame and extending in a generally altitudinal direction upwardly from a given location adjacent the front wheel assembly;

a pack member on the main frame, adjacent the front wheel assembly, the pack member extending in a generally altitudinal direction upwardly from the front wheel assembly and juxtaposed with the handle shaft;

a carrier compartment within the pack member for carrying articles;

a foot board assembly having a near end and a far end spaced away from the near end, the foot board assembly including a foot board extending between the near end and the far end;

a mount mounting the foot board assembly upon the main frame for pivotal movement between an extended position, wherein the foot board extends in a generally longitudinal direction for the reception of a rider, and a retracted position, wherein the foot board extends in the generally altitudinal direction in juxtaposition with the pack member; and a rear wheel assembly adjacent the far end of the foot board assembly for selectively being spaced from the front wheel assembly in the longitudinal direction, when the foot board assembly is in the extended position, thereby placing the combination in the scooter configuration so as to support the rider on the foot board between the front wheel assembly and the rear wheel assembly, and for selectively being retracted into juxtaposition with the pack member, when the foot board assembly is in the retracted position, thereby placing the combination in the pack configuration;

the foot board assembly including a sub-frame for selective extension and retraction along a longitudinal axis extending between the near end and the far end of the foot board assembly, the selective extension enabling selective increase and decrease of the longitudinal spacing between the rear wheel assembly and the front wheel assembly in the scooter configuration of the combination, and enabling decreased spacing between the near end and the far end in the pack configuration of the combination.

8. The combination of claim 7 wherein the sub-frame includes telescoping frame members movable relative to one another for the selective extension and retraction along the longitudinal axis, and a locking mechanism for selective locking of the telescoping frame members against the relative movement upon reaching a selected spacing.

9. The combination of claim 7 wherein the rear wheel assembly includes a rear wheel journaled for rotation about a rear lateral axis, the rear wheel being mounted for selective swiveling movement about the longitudinal axis to retract the rear wheel into juxtaposition with the pack member when the combination is in the pack configuration.

10. A combination wheeled vehicle and article carrier capable of being converted between selected configurations, including a rider-carrying scooter configuration and a rider-carried pack configuration, the combination comprising:

a main frame;

a front wheel assembly on the main frame;

a handle having a handle shaft mounted upon the main frame and extending in a generally altitudinal direction upwardly from a given location adjacent the front wheel assembly;

a pack member on the main frame, adjacent the front wheel assembly, the pack member extending in a generally altitudinal direction upwardly from the front wheel assembly and juxtaposed with the handle shaft;

a carrier compartment within the pack member for carrying articles;

a foot board assembly having a near end and a far end spaced away from the near end, the foot board assembly including a foot board extending between the near end and the far end;

a mount mounting the foot board assembly upon the main frame for pivotal movement between an extended position, wherein the foot board extends in a generally longitudinal direction for the reception of a rider, and a retracted position, wherein the foot board extends in the generally altitudinal direction in juxtaposition with the pack member; and a rear wheel assembly adjacent the far end of the foot board assembly for selectively being spaced from the front wheel assembly in the longitudinal direction, when the foot board assembly is in the extended position, thereby placing the combination in the scooter configuration so as to support the rider on the foot board between the front wheel assembly and the rear wheel assembly, and for selectively being retracted into juxtaposition with the pack member, when the foot board assembly is in the retracted position, thereby placing the combination in the pack configuration;

the front wheel assembly including a truck having at least two wheels, the two wheels being spaced laterally from one another and journaled for rotation about front lateral axes in response to a forward movement of the main frame, the truck being mounted upon the main frame for pivotal movement about a directional axis lying in an intermediate plane passing between the front wheels, the directional axis making an acute angle with the altitudinal direction and being located forward of the front lateral axes such that upon tilting of the main frame in a tilting direction about a longitudinal axis lying in the intermediate plane, the truck is biased into pivotal movement in a steered direction corresponding to the tilting direction, in response to the forward movement of the main frame.

11. The combination of claim 10 wherein the given location at which the handle shaft is mounted upon the main frame is placed rearward of the directional axis.

12. The combination of claim 10 including a wheel retraction mechanism for selectively moving the front wheels between a running position, wherein the front wheels are spaced altitudinally downwardly from the pack member, and a wheel-retracted position, wherein the front wheels are retracted into juxtaposition with the pack member.

13. The combination of claim 12 including a handle mounting arrangement mounting the handle upon the main frame for movement in altitudinal directions between a handle-extended position, wherein the handle is spaced altitudinally upwardly from the pack member in position to be grasped by the rider, and a handle-retracted position, wherein the handle is retracted into juxtaposition with the pack member.

14. The combination of claim 13 including a coupling for coupling the handle with the wheel retraction mechanism such that upon movement of the handle to the handle-extended position, the front wheels are moved to the running position, and upon movement of the handle to the handle-retracted position, the front wheels are moved to the wheel-retracted position.

15. The combination of claim 14 wherein the foot board assembly includes a sub-frame for selective extension and retraction along a longitudinal axis extending between the near end and the far end of the foot board assembly, the selective extension enabling selective increase and decrease of the longitudinal spacing between the rear wheel assembly and the front wheel assembly in the scooter configuration of the combination, and enabling decreased spacing between the near end and the far end in the pack configuration of the combination.

\* \* \* \* \*